United States Patent
Mattis et al.

(10) Patent No.: US 10,431,819 B2
(45) Date of Patent: Oct. 1, 2019

(54) ANODE SLURRY AND METHOD FOR PREPARING THE SAME

(71) Applicants: Microvast Power Systems Co., Ltd., Huzhou, Zhejiang Province (CN); Ochem Chemical Co., Ltd., Huzhou, Zhejiang Province (CN)

(72) Inventors: Wenjuan Liu Mattis, Huzhou (CN); Tianshu Deng, Huzhou (CN); Ruanbing Hu, Huzhou (CN); Chaofeng Ning, Huzhou (CN)

(73) Assignees: MICROVAST POWER SYSTEMS CO., LTD., Huzhou, Zhejiang Province (CN); OCHEM CHEMICAL CO., LTD., Huzhou, Zhejiang Province (CN)

( * ) Notice: Subject to any disclaimer, the term of this patent is extended or adjusted under 35 U.S.C. 154(b) by 44 days.

(21) Appl. No.: 15/378,031

(22) Filed: Dec. 13, 2016

(65) Prior Publication Data

US 2017/0170472 A1    Jun. 15, 2017

(30) Foreign Application Priority Data

Dec. 14, 2015   (CN) .......................... 2015 1 0925865

(51) Int. Cl.
*H01B 1/22*   (2006.01)
*H01B 1/24*   (2006.01)
(Continued)

(52) U.S. Cl.
CPC .............. *H01M 4/386* (2013.01); *C08F 2/16* (2013.01); *C08F 2/44* (2013.01); *C08F 4/30* (2013.01); *C08F 120/06* (2013.01); *C08F 222/02* (2013.01); *H01B 1/22* (2013.01); *H01B 1/24* (2013.01); *H01M 4/134* (2013.01);
(Continued)

(58) Field of Classification Search
CPC .. H01B 1/00; H01B 1/22; H01B 1/24; H01M 4/04; H01M 4/049
See application file for complete search history.

(56) References Cited

U.S. PATENT DOCUMENTS

| 7,981,543 B2 * | 7/2011 | Kim .................... H01M 4/0404 427/209 |
| 9,780,377 B2 * | 10/2017 | Morita .............. H01M 10/0565 |
| 2013/0045423 A1 * | 2/2013 | Lim .......................... H01B 1/04 429/231.5 |

FOREIGN PATENT DOCUMENTS

| CN | 101103475 A | 1/2008 |
| CN | 101278423 A | 10/2008 |

(Continued)

*Primary Examiner* — Mark Kopec
(74) *Attorney, Agent, or Firm* — Cheng-Ju Chiang

(57) ABSTRACT

The present invention provides a method for preparing an anode slurry used in a lithium ion battery. The method includes the following steps: providing at least one anode active material, at least one conductive agent, at least one monomer or a prepolymer and at least one solvent. Mixing the anode active material, the conductive agent and the monomer or the prepolymer with the solvent; dispersing uniformly to form a mixture. Adding an initiator into the mixture; polymerizing the monomer or the prepolymer at a certain temperature; and yielding the anode slurry. Besides, the present invention also provides an anode slurry prepared by the above method, and an anode plate prepared by the anode slurry, and a lithium ion battery including the anode plate.

20 Claims, 1 Drawing Sheet

(51) Int. Cl.
    *H01M 4/00*     (2006.01)
    *H01M 4/38*     (2006.01)
    *H01M 4/62*     (2006.01)
    *H01M 4/587*     (2010.01)
    *C08F 2/44*     (2006.01)
    *C08F 4/30*     (2006.01)
    *H01M 4/134*     (2010.01)
    *H01M 4/1395*     (2010.01)
    *H01M 10/052*     (2010.01)
    *C08F 120/06*     (2006.01)
    *C08F 2/16*     (2006.01)
    *C08F 222/02*     (2006.01)
    *H01M 4/02*     (2006.01)

(52) U.S. Cl.
    CPC ......... *H01M 4/1395* (2013.01); *H01M 4/587* (2013.01); *H01M 4/622* (2013.01); *H01M 4/625* (2013.01); *H01M 10/052* (2013.01); *H01M 2004/021* (2013.01); *H01M 2004/027* (2013.01)

(56) References Cited

FOREIGN PATENT DOCUMENTS

| | | |
|---|---|---|
| CN | 101447561 A | 6/2009 |
| CN | 102842701 A | 12/2012 |
| CN | 103904299 A | 7/2014 |
| CN | 104538635 A | 4/2015 |
| CN | 104701494 A | 6/2015 |
| CN | 104953124 A | 9/2015 |

\* cited by examiner

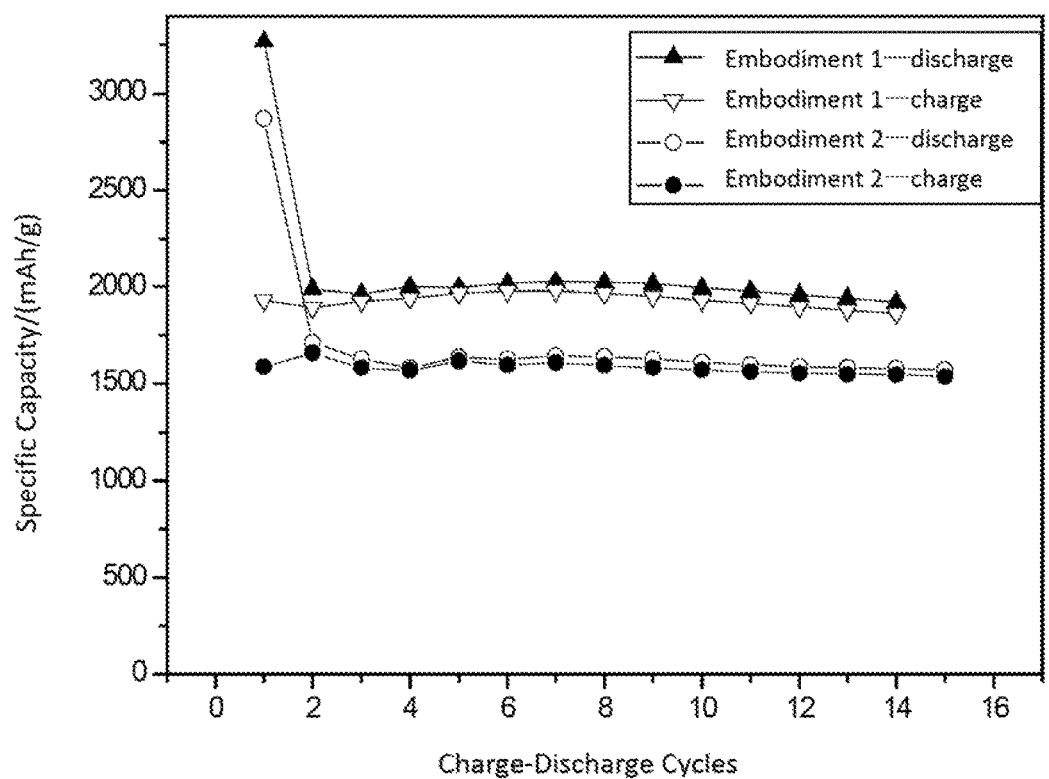

US 10,431,819 B2

ANODE SLURRY AND METHOD FOR PREPARING THE SAME

CROSS REFERENCE TO RELATED APPLICATION

The present application is based on and claims priority of Chinese patent application No. 201510925865.3, filed on Dec. 14, 2015. The entire disclosure of the above-identified application, including the specification, drawings and claims are incorporated herein by reference in its entirety.

FIELD OF THE INVENTION

The present invention relates to a method for preparing an anode slurry used in a lithium battery and an anode slurry prepared by the method, and an anode plate prepared by the anode slurry and a lithium battery including the anode plate.

BACKGROUND OF THE INVENTION

Lithium ion batteries have replaced traditional batteries in the fields of mobile phones and portable computers etc., due to their advantages of higher working voltage, higher energy density, larger output power and longer cycle life. Lithium ion batteries with high capacity have been widely used in electric vehicles, and will become one of the main power supplies of electric vehicles in the $21^{st}$ century.

In order to endow the electric vehicles with longer mileages, higher requirements to the energy density of batteries have been put forth. Conventional anode active materials of commercialized lithium ion batteries are mainly carbon materials, such as graphite with a theoretical capacity 372 mAh/g only. This has greatly limited the improvement of the energy density. Because of this, new generation of anode active materials is under development, which has a theoretical capacity significantly higher than that of conventional carbon materials. For example, materials containing Si, Sn, or the like, which are capable of alloying lithium with ease. Since silicon (Si) has a theoretical capacity (4199 mAh/g) much higher than that of conventional carbon materials, which offers a prospect of greatly increasing the battery capacity, it has become research hotspots in anode field recently.

Theoretically, the battery capacity will be improved when using silicon or the like with higher theoretical capacity as the anode active material. However, silicon has disadvantages as below: it will strongly expand or contract during the charge/discharge process, which leads to a large volume change greater than 300%. This tends to cause cracks or even pulverization near its surface. Further, cracks on anode materials will reduce the electrical conductivity of the materials, and create new active surfaces. The new active surfaces can accelerate the decomposition of the electrolytes and form a film on the new active surfaces. These will badly affect the cycling performance of the lithium ion batteries. In addition, conventional anode plate is prepared by the following steps: first, mixing an anode active material, a binder, a conductive agent and a solvent etc. to form slurry; and then coating the slurry onto an anode current collector. During the charging or discharging, violent volume change will weaken the adhesion between the active material layer and the current collector. Even if fluorine-containing resin or the like is used as the binder, it is still difficult to maintain good contact between the active material layer and the current collector. Along this, the active material layer will inevitably peel off the current collector, and the cycling performance of the lithium ion batteries will rapidly decrease.

To solve the problems above and restrain the silicon expansion, conventional methods include the following: limiting the size of silicon particles (for example, making silicon nanoparticles, silicon nanowires or silicon nanotubes), compositing or coating with carbon materials. However, these methods provide limited benefits in improving the performance of silicon anode materials. Nano silicon particles are very prone to accumulate, which makes the nano materials cannot maximize their advantages; meanwhile, as regard to compositing or coating with carbon materials, the bonding between the silicon and carbon elements is weak, which makes the silicon anode material cannot deliver its electrochemical performances. Moreover, the above preparation methods are complicated, which will obviously add to the cost of lithium-ion battery.

SUMMARY OF THE INVENTION

In order to solve the problems above, the present invention provides a method for preparing an anode slurry used in a lithium secondary battery, and an anode slurry prepared by the method above. In the present invention, a monomer or prepolymer undergoes an in-situ polymerization during the slurry preparation. The polymerized monomers or prepolymers act as a binder, which benefit the uniform dispersion of the silicon based anode active material in the slurry. Therefore, the cycling performance of the prepared anode plate is greatly improved.

The present invention provides a method for preparing an anode slurry used in a lithium ion battery, which including the following steps: providing at least one anode active material, at least one conductive agent, at least one monomer or prepolymer, and at least one solvent; mixing the anode active material, the conductive agent and the monomer or prepolymer with the solvent, dispersing uniformly to form a dispersion; and adding an initiator into the dispersion to induce polymerization of the monomer or the prepolymer, thereby yielding an anode slurry.

In the present invention, the anode active material includes silicon, which is at least one selected from the group consisting of silicon powder, nano-silicon particles, and silicon-carbon composite. In one embodiment, an average particle diameter ($D_{50}$) of the silicon powder or the nano-silicon particles is between 20 nm and 2000 nm. In another embodiment, the average particle diameter of the silicon powder or the nano-silicon particles is between 50 nm and 500 nm. In still another embodiment, the average particle diameter of the silicon powder or the nano-silicon particles is between 50 nm and 200 nm. In one embodiment, an average particle diameter of the silicon-carbon composite is between 1 μm and 100 μm.

In one embodiment, a BET specific surface area of the anode active material is 1 cm$^2$/g to 100 cm$^2$/g. In another embodiment, the BET specific surface area of the anode active material is 1 cm$^2$/g to 50 cm$^2$/g. In one embodiment, a tap density of the anode active material is 0.1 g/cm$^3$ to 1.5 g/cm$^3$.

In one embodiment, an initial coulombic efficiency of the anode active material is greater than 50%. In another embodiment, the initial coulombic efficiency of the anode active material is greater than 70%. In still another embodiment, the initial coulombic efficiency of the anode active material is greater than 80%.

In one embodiment of the present invention, the monomer is at least one selected from the group consisting of acrylic acid, methacrylic acid and itaconic acid; the prepolymer is at least one selected from acrylic prepolymer, methacrylic acid prepolymer, and itaconic acid prepolymer.

In one embodiment of the present invention, the solvent is water and/or organic solvents, the organic solvents is alcohol solvents or ketone solvents. For example, the organic solvent is at least one selected from methanol, ethanol and acetone.

In one embodiment of the present invention, the conductive agent is at least one selected from the group consisting of carbon power, carbon fiber, conductive carbon black (e.g., Ketjenblack, acetylene black or Super P, etc.), carbon nanotube, flaky graphite and graphene.

The initiator of the present invention is persulfates, e.g., sodium persulfate, potassium persulfate or ammonium persulfate.

In one embodiment, a mass of the anode active material accounts for 5% to 50% of the total mass of the anode slurry. In another embodiment, the mass of the anode active material accounts for 10% to 35% of the total mass of the anode slurry. In still another embodiment, the mass of the anode active material accounts for 15% to 20% of the total mass of the anode slurry.

In one embodiment, a mass of the conductive agent accounts for 0.1% to 5% of the total mass of the anode slurry. In another embodiment, the mass of the conductive agent accounts for 0.5% to 3% of the total mass of the anode slurry.

In one embodiment, a mass of the monomer or the prepolymer accounts for 5% to 50% of the total mass of the anode slurry. In another embodiment, the mass of the monomer or the prepolymer accounts for 10% to 30% of the total mass of the anode slurry.

In one embodiment, a mass of the solvent accounts for 20% to 85% of the total mass of the anode slurry. In another embodiment, the mass of the solvent accounts for 30% to 80% of the total mass of the anode slurry. In still another embodiment, the mass of the solvent accounts for 50% to 70% of the total mass of the anode slurry.

In one embodiment, a mass of the initiator accounts for 0.1% to 5% of the total mass of the anode slurry. In another embodiment, the mass of the initiator accounts for 0.5% to 3% of the total mass of the anode slurry.

The method for preparing the anode slurry of the invention includes the following steps: providing different proportions of anode active material (such as silicon powder), conductive agent (such as carbon black), monomer (such as acrylic acid) or prepolymer, and solvent; stirring and dispersing in high-speed mixer to form a dispersion, wherein the stirring time is 30 to 60 min, and the speed is 800 to 1500 rpm. Adding an initiator into the dispersion; inducing polymerization of the monomer or the prepolymer, and yielding the anode slurry.

In one embodiment, the temperature of the polymerization is between 30 and 120° C. In another embodiment, the temperature of the polymerization is 50 to 100° C. In still another embodiment, the temperature of the polymerization is 65 to 85° C.

In one embodiment, a reaction time of the polymerization is between 1 to 10 hours. In another embodiment, the reaction time of the polymerization is between 2 to 6 hours. In still another embodiment, the reaction time of the polymerization is between 2 to 4 hours.

In one embodiment, the above-mentioned polymerization is carried out at certain temperature in the presence of the initiator. In another embodiment, the polymerization is a photopolymerization performed under the existence of light (such as ultraviolet light).

In one embodiment, a viscosity of the anode slurry prepared above is 1000 to 8000 mPa·s. In another embodiment, the viscosity of the anode slurry is 2000 to 5000 mPa·s. The viscosity in the present invention is measured by a rotary viscometer NDG-5S.

The present invention also provides an anode slurry prepared by the above-mentioned method.

Meanwhile, the present invention also provides an anode prepared by the anode slurry described above, and a lithium ion battery including the anode above.

In the present invention, hydroxyl groups exist on the surface of the silicon-based anode active material, and carboxyl groups exist in the acrylic acid monomers or prepolymers. Esterification reaction will take place between the hydroxyl groups and the carboxyl groups, forming firmly combined chemical bonds. Instead of breaking apart during the volume change of the silicon-based anode material, the firmly combined chemical bonds in formed ester groups will expand or compress according to the volume change of it.

Next, during the esterification reaction above, the silicon-based materials are dispersed uniformly in the polymer chains. Meanwhile, a solid electrolyte interface (SEI) will be formed on the surface of the silicon-based anode materials, which will improve the initial coulombic efficiency of the anode materials and extend the life-span of the batteries.

Further, the poly(acrylic acid) or the like has strong adhesion to the current collector, and tends to be infiltrated by the electrolyte. Correspondingly, the anode active materials coated in the poly(acrylic acid) also have strong adhesion to the current collector. Meanwhile, the conductive agent is dispersed uniformly in the anode plate during the polymerization. All the above forms a smooth network for the conduction of the lithium ions and the electrons. In view of the above, all these endow the batteries a longer life-span.

BRIEF DESCRIPTION OF THE DRAWINGS

The FIGURE illustrates the cycling performance test results of the button batteries prepared in embodiment 1 and embodiment 2 of the present invention.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed. In the embodiments below, a Ketjenblack conductive agent EC600JD is provided by AkzoNobel, and a silicon-carbon anode composite is provided by Shenzhen BTR new energy materials Inc.

Embodiment 1

Mixing 10 g nano-silicon powder, 1 g Ketjenblack conductive agent (EC600JD) and 9 g acrylic acid with 30 g water, wherein the average diameter $D_{50}$ of the nano-silicon powder being 200 nm. After stirring and ultrasonic dispersing treatment, a $1^{st}$ mixture is obtained. Next, dissolving 1.5 g sodium persulfate (abbr. as SPS) into 10 g water to obtain a $2^{nd}$ mixture, wherein the SPS acting as an initiator. Finally, adding the $2^{nd}$ mixture into the $1^{st}$ mixture, stirring at 70° C. for 3 hours, and yielding anode slurry of the lithium batteries.

Embodiment 2

Mixing 10 g nano-silicon powder, 1 g Ketjenblack conductive agent (EC600JD) and 9 g acrylic acid with 30 g water, wherein the $D_{50}$ of the nano-silicon powder being 100 nm. After stirring and ultrasonic dispersing treatment, a $1^{st}$ mixture is obtained. Next, dissolving 1 g ammonium persulfate (abbr. as APS) into 10 g water to obtain a $2^{nd}$ mixture, wherein the SPS acting as initiator. Finally, adding the $2^{nd}$ mixture into the $1^{st}$ mixture, stirring at 75° C. for 4 hours, and yielding anode slurry of lithium batteries.

Embodiment 3

Mixing 5 g nano-silicon powder, 0.5 g Super P conductive agent and 7 g acrylic acid with 40 g water, after stirring and ultrasonic dispersing treatment, a $1^{st}$ mixture is obtained. Next, dissolving 1 g APS into 10 g water to obtain a $2^{nd}$ mixture, wherein the APS acting as initiator. Finally, adding the $2^{nd}$ mixture into the $1^{st}$ mixture, stirring at 100° C. for 2 hours, and yielding anode slurry of lithium batteries.

Embodiment 4

Mixing 8 g nano-silicon powder, 0.5 g Super P conductive agent and 7 g acrylic acid with 25 g water, after stirring and ultrasonic dispersing treatment, a $1^{st}$ mixture is obtained. Next, dissolving 1 g SPS into 10 g water to obtain a $2^{nd}$ mixture, wherein the SPS acting as initiator. Finally, adding the $2^{nd}$ mixture into the $1^{st}$ mixture, stirring at 60° C. for 4 hours, and yielding anode slurry of lithium batteries.

Embodiment 5

Mixing 15 g nano-silicon powder, 0.5 g Super P conductive agent and 7 g acrylic acid with 25 g water, after stirring and ultrasonic dispersing treatment, a $1^{st}$ mixture is obtained. Next, dissolving 0.5 g SPS into 10 g water to obtain a $2^{nd}$ mixture, wherein the SPS acting as initiator. Finally, adding the $2^{nd}$ mixture into the $1^{st}$ mixture, stirring at 60° C. for 9 hours, and yielding anode slurry of lithium batteries.

Embodiment 6

Mixing 10 g silicon-carbon anode composite, 1 g Super P conductive agent and 7 g acrylic acid with 25 g water, wherein the $D_{50}$ of the silicon-carbon anode composite being 10 μm. After stirring and ultrasonic dispersing treatment, a $1^{st}$ mixture is obtained. Next, dissolving 0.5 g SPS into 10 g water to obtain a $2^{nd}$ mixture, wherein the SPS acting as initiator. Finally, adding the $2^{nd}$ mixture into the $1^{st}$ mixture, stirring at 60° C. for 6 hours, and yielding anode slurry of lithium batteries.

Embodiment 7

Mixing 15 g silicon-carbon anode composite, 1 g Super P conductive agent and 7 g acrylic acid with 25 g water, after stirring and ultrasonic dispersing treatment, a $1^{st}$ mixture is obtained. Next, dissolving 0.5 g SPS into 10 g water to obtain a $2^{nd}$ mixture, wherein the SPS acting as initiator. Finally, adding the $2^{nd}$ mixture into the $1^{st}$ mixture, stirring at 90° C. for 4 hours, and yielding anode slurry of lithium batteries.

Embodiment 8

Mixing 20 g silicon-carbon anode composite, 2 g Super P conductive agent and 7 g acrylic acid with 45 g water, after stirring and ultrasonic dispersing treatment, a $1^{st}$ mixture is obtained. Next, dissolving 1 g SPS into 10 g water to obtain a $2^{nd}$ mixture, wherein the SPS acting as initiator. Finally, adding the $2^{nd}$ mixture into the $1^{st}$ mixture, stirring at 60° C. for 4 hours, and yielding anode slurry of lithium batteries.

Embodiment 9

Mixing 20 g silicon-carbon anode composite, 0.5 g Super P conductive agent and 7 g acrylic acid with 45 g water, after stirring and ultrasonic dispersing treatment, a $1^{st}$ mixture is obtained. Next, dissolving 0.5 g SPS into 10 g water to obtain a $2^{nd}$ mixture, wherein the SPS acting as initiator. Finally, adding the $2^{nd}$ mixture into the $1^{st}$ mixture, stirring at 95° C. for 4 hours, and yielding anode slurry of lithium batteries.

Embodiment 10

Mixing 20 g silicon-carbon anode composite, 0.5 g Ketjenblack conductive agent (EC600JD) and 7 g acrylic acid with 45 g water, after stirring and ultrasonic dispersing treatment, a $1^{st}$ mixture is obtained. Next, dissolving 0.5 g SPS into 10 g water to obtain a $2^{nd}$ mixture, wherein the SPS acting as initiator. Finally, adding the $2^{nd}$ mixture into the $1^{st}$ mixture, stirring at 70° C. for 4 hours, and yielding anode slurry of lithium batteries.

Embodiment 11

Mixing 20 g silicon-carbon anode composite, 0.5 g Ketjenblack conductive agent (EC600JD) and 7 g acrylic acid with 45 g water, after stirring and ultrasonic dispersing treatment, a $1^{st}$ mixture is obtained. Next, dissolving 0.5 g SPS into 10 g water to obtain a $2^{nd}$ mixture, wherein the SPS acting as initiator. Finally, adding the $2^{nd}$ mixture into the $1^{st}$ mixture, stirring at 60° C. for 8 hours, and yielding anode slurry of lithium batteries.

Embodiment 12

Mixing 20 g silicon-carbon anode composite, 0.5 g Ketjenblack conductive agent (EC600JD) and 7 g acrylic acid with 45 g water, after stirring and ultrasonic dispersing treatment, a $1^{st}$ mixture is obtained. Next, dissolving 2 g SPS into 10 g water to obtain a $2^{nd}$ mixture, wherein the SPS acting as initiator. Finally, adding the $2^{nd}$ mixture into the $1^{st}$ mixture, stirring at 90° C. for 2 hours, and yielding lithium battery anode slurry.

Embodiment 13

Mixing 25 g silicon-carbon anode composite, 0.5 g Ketjenblack conductive agent (EC600JD) and 7 g acrylic acid with 45 g water, after stirring and ultrasonic dispersing treatment, a $1^{st}$ mixture is obtained. Next, dissolving 2 g SPS into 10 g water to obtain a $2^{nd}$ mixture, wherein the SPS acting as initiator. Finally, adding the 2$^{nd}$ mixture into the 1$^{st}$ mixture, stirring at 100° C. for 2 hours, and yielding lithium battery anode slurry.

Embodiment 14

Mixing 25 g silicon-carbon anode composite, 0.5 g Ketjenblack conductive agent (EC600JD) and 7 g acrylic acid with 20 g water and 25 g ethanol, after stirring and ultrasonic dispersing treatment, a 1$^{st}$ mixture is obtained. Next, dissolving 2 g SPS into 10 g water to obtain a 2$^{nd}$ mixture, wherein the SPS acting as initiator. Finally, adding the 2$^{nd}$ mixture into the 1$^{st}$ mixture, stirring at 110° C. for 2 hours, and yielding lithium battery anode slurry.

Embodiment 15

Mixing 25 g silicon-carbon anode composite, 0.5 g Ketjenblack conductive agent (EC600JD) and 7 g acrylic acid with 60 g water, after stirring and ultrasonic dispersing treatment, a 1$^{st}$ mixture is obtained. Next, dissolving 2 g SPS into 10 g water to obtain a 2$^{nd}$ mixture, wherein the SPS acting as initiator. Finally, adding the 2$^{nd}$ mixture into the 1$^{st}$ mixture, stirring at 70° C. for 2 hours, and yielding lithium battery anode slurry.

Embodiment 16

Mixing 25 g silicon-carbon anode composite, 0.5 g Ketjenblack conductive agent (EC600JD) and 7 g acrylic acid with 20 g water and 25 g ethanol, after stirring and ultrasonic dispersing treatment, a 1$^{st}$ mixture is obtained. Next, dissolving 2 g SPS into 10 g water to obtain a 2$^{nd}$ mixture, wherein the SPS acting as initiator. Finally, adding the 2$^{nd}$ mixture into the 1$^{st}$ mixture, stirring at 70° C. for 2 hours, and yielding lithium battery anode slurry.

Embodiment 17

Mixing 25 g silicon-carbon anode composite, 0.5 g Ketjenblack conductive agent (EC600JD) and 7 g itaconic acid (abbr. as ITA) with 40 g water, after stirring and ultrasonic dispersing treatment, a 1$^{st}$ mixture is obtained. Next, dissolving 2 g SPS into 10 g water to obtain a 2$^{nd}$ mixture, wherein the SPS acting as initiator. Finally, adding the 2$^{nd}$ mixture into the 1$^{st}$ mixture, stirring at 50° C. for 10 hours, and yielding lithium battery anode slurry.

Embodiment 18

Mixing 25 g silicon-carbon anode composite, 0.5 g Ketjenblack conductive agent (EC600JD) and 7 g ITA with 40 g water, after stirring and ultrasonic dispersing treatment, a 1$^{st}$ mixture is obtained. Next, dissolving 2 g SPS into 10 g water to obtain a 2$^{nd}$ mixture, wherein the SPS acting as initiator. Finally, adding the 2$^{nd}$ mixture into the 1$^{st}$ mixture, stirring at 80° C. for 2 hours, and yielding lithium battery anode slurry.

Embodiment 19

Mixing 25 g silicon-carbon anode composite, 0.5 g Ketjenblack conductive agent (EC600JD) and 7 g methacrylic acid (abbr. as MAA) with 40 g water, after stirring and ultrasonic dispersing treatment, a 1$^{st}$ mixture is obtained. Next, dissolving 2 g SPS into 10 g water to obtain a 2$^{nd}$ mixture, wherein the SPS acting as initiator. Finally, adding the 2$^{nd}$ mixture into the 1$^{st}$ mixture, stirring at 65° C. for 2 hours, and yielding lithium battery anode slurry.

Button Batteries were prepared by the following method: first, coating the silicon-containing anode slurry onto a copper foil uniformly, wherein the silicon-containing anode slurry is prepared in any of the embodiments 1-19; Then, vacuum-drying and rolling the coated copper foil to form an anode plate, which is going to be used as cathode. Next, a solution of LiPF$_6$ in EC, DMC and EMC mixed solvent system is used as electrolyte, wherein a concentration of LiPF$_6$ in the solution is 1 mol/L, and a volume ratio of EC, DMC and EMC is 1:1:1. Polypropylene microporous membrane is used as the separator. Finally, the above components are assembled into a button battery.

The cycling performance is tested by performing the charge-discharge processes under constant current, wherein the charge-discharge current remains at 0.2 mA, and the charge-discharge voltage is limited within 0.01V to 1.8V. The FIGURE illustrates the cycling performance test results of the button batteries prepared in embodiment 1 and embodiment 2 of the present invention. As shown in the FIGURE, capacity of the lithium batteries prepared in embodiments 1 and 2 reaches 1500 mAh/g to 2000 mAh/g, and the charge-discharge cycle is quite stable. The reason for the improvement above is that, the anode slurries used in the lithium batteries are prepared by silicon (or silicon-carbon) coated with poly acrylic acid through in-situ polymerization. In this way, the silicon (or silicon-carbon) powder is uniformly coated by polymers, thus the volume expansion of silicon is effectively inhibited. Therefore, the silicon powder and the conductive agent maintain good contact with the current collector. All these make the silicon (or silicon-carbon) anode more stable during the charge-discharge processes. Similarly, the anode slurries of embodiments 3-13 also prepared with a material of acrylic acid.

The cycling performance of the batteries in embodiments 14, 15 and 19 is similar to that in embodiments 1 and 2, wherein the anode slurries are prepared by silicon coated with poly(methacrylic acid) by in-situ polymerization, wherein the methacrylic acid includes carboxyl groups. Meanwhile, the cycling performance of the batteries in embodiments 16-18 is also similar to that in embodiments 1 and 2, wherein the anode slurries are prepared by silicon coated with poly (itaconic acid) by in-situ polymerization. As we all know, the itaconic acid is also named as methylene succinic acid, which includes carboxyl groups. That is, the carboxyl groups in acrylic acid, methacrylic acid and itaconic acid enable the in-situ polymerizations taking place, and the silicon powders are uniformly coated by the products during the polymerization reaction.

It will be understood that the above particular embodiments are shown and described by way of illustration only. The principles and the features of the present disclosure may be employed in various and numerous embodiments thereof without departing from the scope of the disclosure. The above-described embodiments illustrate the scope of the disclosure but do not restrict the scope of the disclosure.

What is claimed is:

1. A method for preparing an anode slurry used in a lithium ion battery, comprising: providing at least one anode active material, at least one conductive agent, at least one monomer or prepolymer, and at least one solvent; mixing the anode active material, the conductive agent and the monomer or prepolymer with the solvent, dispersing uniformly to form a dispersion; and adding an initiator into the dispersion and therefore inducing a polymerization of the monomer or the prepolymer, thereby yielding an anode slurry; the monomer is at least one selected from the group consisting of acrylic acid, methacrylic acid and itaconic acid; the prepolymer is selected from at least one of acrylic prepolymers, methacrylic acid prepolymer, and itaconic acid prepolymer; wherein said polymerization of the monomer or prepolymer is induced prior to coating onto a current collector.

2. The method of claim 1, wherein the anode active material comprises silicon, which is at least one selected from the group consisting of silicon powder, nano-silicon particles, and silicon-carbon composite.

3. The method of claim 2, wherein an average particle diameter of the silicon powder or the nano-silicon particles is between 20 nm and 2000 nm.

4. The method of claim 2, wherein an average particle diameter of the silicon-carbon composite is between 1 μm and 100 μm.

5. The method of claim 1, wherein a BET specific surface area of the anode active material is from 1 $cm^2/g$ to 100 $cm^2/g$.

6. The method of claim 1, wherein an initial coulombic efficiency of the anode active material is greater than 50%.

7. The method of claim 1, wherein the solvent is water and/or organic solvent, the organic solvent is alcoholic solvent or ketone solvent.

8. The method of claim 7, wherein the organic solvent is at least one selected from methanol, ethanol and acetone.

9. The method of claim 1, wherein the conductive agent is at least one selected from the group consisting of carbon power, carbon fiber, conductive carbon black, carbon nanotube, flaky graphite and graphene; a mass of the conductive agent accounts for 0.1% to 5% of the total mass of the anode slurry.

10. The method of claim 1, wherein the initiator is at least one selected from the group consisting of sodium persulfate, potassium persulfate and ammonium persulfate; a mass of the initiator accounts for 0.1% to 5% of the total mass of the anode slurry.

11. The method of claim 1, wherein a mass of the anode active material accounts for 5% to 50% of the total mass of the anode slurry.

12. The method of claim 1, wherein a mass of the monomer or prepolymer accounts for 5% to 50% of the total mass of the anode slurry.

13. The method of claim 1, wherein a mass of the solvent accounts for 20% to 85% of the total mass of the anode slurry.

14. The method of claim 1, wherein a temperature of polymerization is between 30° C. to 120° C.

15. The method of claim 14, wherein the temperature of polymerization is between 50° C. to 100° C.

16. The method of claim 14, wherein the temperature of polymerization is between 65° C. to 85° C.

17. The method of claim 1, wherein a reaction time of the polymerization is between 1 to 10 hours.

18. The method of claim 17, wherein the reaction time of the polymerization is between 2 to 6 hours.

19. The method of claim 17, wherein the reaction time of the polymerization is between 2 to 4 hours.

20. The method of claim 1, wherein a viscosity of the anode slurry prepared above is 1000 to 8000 mPa·s.

* * * * *